United States Patent
Layton (10) Patent No.: US 9,507,327 B2
(45) Date of Patent: Nov. 29, 2016

(54) SYSTEMS AND METHODS FOR CONTROLLING HOME AND COMMERCIAL ENVIRONMENTS INCLUDING ONE TOUCH AND INTUITIVE FUNCTIONALITY

(75) Inventor: William Kent Layton, Littleton, CO (US)

(73) Assignee: LIAISON HOME AUTOMATION, LLC, Mt. Zion, IL (US)

( * ) Notice: Subject to any disclaimer, the term of this patent is extended or adjusted under 35 U.S.C. 154(b) by 1037 days.

(21) Appl. No.: 13/452,289

(22) Filed: Apr. 20, 2012

(65) Prior Publication Data

US 2013/0282180 A1 Oct. 24, 2013

(51) Int. Cl.
G05B 15/02 (2006.01)
G06F 3/0488 (2013.01)
H02J 13/00 (2006.01)

(52) U.S. Cl.
CPC ........... *G05B 15/02* (2013.01); *G06F 3/04886* (2013.01); *H02J 13/001* (2013.01); *G05B 2219/2642* (2013.01); *G05B 2219/32085* (2013.01); *Y04S 10/40* (2013.01)

(58) Field of Classification Search
CPC .. G05B 15/00; G05B 19/04; G05B 19/0425; G05B 2219/2613; G05B 15/02; G05B 2219/2614; G05B 2219/2642; H04L 12/2803; H04L 12/2816; H04L 12/282; G06F 3/0481; G06F 3/04847; G06F 3/04886; Y02B 70/325; G08B 25/008; Y04S 10/40; Y04S 20/228; H02J 13/001
USPC ......................................................... 700/275
See application file for complete search history.

(56) References Cited

U.S. PATENT DOCUMENTS

| | | | | |
|---|---|---|---|---|
| 5,086,385 | A * | 2/1992 | Launey et al. | 700/83 |
| 6,756,998 | B1 * | 6/2004 | Bilger | 715/764 |
| 6,967,565 | B2 * | 11/2005 | Lingemann | G05B 15/02 340/12.23 |
| 7,567,844 | B2 * | 7/2009 | Thomas | G05B 15/02 348/143 |
| 7,730,223 | B1 * | 6/2010 | Bavor et al. | 710/8 |
| 7,847,790 | B2 * | 12/2010 | Bewley | G06F 3/04886 345/102 |
| 8,344,665 | B2 * | 1/2013 | Verfuerth | H05B 37/0272 315/150 |
| 2005/0229103 | A1 * | 10/2005 | King | G06F 3/0481 715/741 |
| 2010/0283579 | A1 * | 11/2010 | Kraus et al. | 340/5.7 |
| 2015/0322652 | A1 * | 11/2015 | Mazz | E03C 1/055 137/560 |

* cited by examiner

*Primary Examiner* — Crystal J Barnes-Bullock
(74) *Attorney, Agent, or Firm* — Stinson Leonard Street LLP (57) ABSTRACT

To provide an improved system for home environment control, in one embodiment, a system for controlling a living environment includes a computing device having a touch screen input system, the computing device including an interface. The interface includes a graphical representation of the living environment. The interface provides for control of a plurality of systems distributed in the living environment. The plurality of environmental systems is distributed in a plurality of rooms that make up the living environment. The interface is configured to activate a portion of the plurality of environmental systems upon a single touch command of a user received by the interface via the touch screen input system of the computing device.

15 Claims, 6 Drawing Sheets

SYSTEMS AND METHODS FOR CONTROLLING HOME AND COMMERCIAL ENVIRONMENTS INCLUDING ONE TOUCH AND INTUITIVE FUNCTIONALITY

BACKGROUND

The ability to control home systems is desirable to the consumer. Consumers desire controls that are intuitive and that provide a high degree of control. Consumers desire to be able to remotely control home systems as well.

BRIEF SUMMARY

To provide an improved system for home and commercial environment control, in one embodiment, a system for controlling a living environment includes a computing device having a touch screen input system, the computing device including an interface. The interface includes a graphical representation of the living environment. The interface provides for control of a plurality of systems distributed in the living environment. The plurality of environmental systems is distributed in a plurality of rooms that make up the living environment. The interface is configured to activate a portion of the plurality of environmental systems upon a single touch command of a user received by the interface via the touch screen input system of the computing device. In some alternatives, the portion of the plurality of environmental systems are interrelated in their function. Optionally, the portion of the plurality of environmental systems are all in a first room of the plurality of rooms, and the single touch command is a touch of a representation of the first room in the living environment, representation of the first room being part of the graphical representation of the living environment. In some configurations, the function is lighting. Alternatively, the computing device communicates wirelessly with the plurality of environmental systems. Optionally, the portion of the plurality of environmental systems includes multiple lighting devices. In one alternative, the interface is configured to cause the first room to glow when activated. In one configuration, the interface is configured to allow the first room to be selected, and the interface is configured to provide a closer view of the first room. Optionally, the interface is configured to provide control of individual systems of the plurality of environmental systems in the first room when the closer view of the first room is provided. Alternatively, the plurality of environmental systems are selected from a list consisting of lighting systems, home theater systems, climate control systems, irrigation systems, motorized window coverings, security systems, hot tubs, fountains, and pools.

In another embodiment, a system for controlling a home environment includes a computing device having an interface. The computing device communicates wirelessly with a plurality of home systems. The plurality of home systems are selected from a list consisting of lighting systems, home theater systems, climate control systems, irrigation systems, blinds systems, and security systems. The interface receives touch-based commands through the computing device. The interface provides and displays a plan view of the home environment. The interface is configured to actuate a room-wide system when a room on the plan view is touched, the room-wide system being deployed in the room. The room-wide system is included within one of the plurality of home systems. The room-wide system includes more than one separately deployed and interconnected device.

In one embodiment, a method of controlling a home environment includes creating a graphical representation of a living environment. The method further includes creating a plurality of versions of the graphical representation of the living environment providing for highlighting of particular rooms of the graphical representation of the living environment. The method further includes loading the graphical representation on a touch screen interface computing device. The method further includes interconnecting a plurality of home systems with graphical representations. Optionally, the method further includes receiving a touch-based command at the touch screen interface computing device, the touch-based command being a single touch on a symbolic room, the symbolic room being part of the graphical representation, the symbolic room being related to an actual room of the living environment, and activating a portion of a first home system of the plurality of home systems, the portion of the first home system being in the actual room. Alternatively, the method further includes causing the symbolic room to glow responsive to the touch-based command. In one alternative, the method includes communicating to the portion of the first home system through a wireless interface. Optionally, the plurality of home systems include lighting systems, home theater systems, climate control systems, irrigation systems, blinds systems, and security systems. Alternatively, the first home system is a lighting system. Optionally, the portion of the first home system includes more than one lighting device. In one option, the method further includes receiving a first selection of a menu button; displaying a menu of environmental controls reflective of the plurality of home systems; receiving a second selection of one of the menu of environmental controls; and displaying the graphical representation of the living environment related to the one of the menus of environmental controls. In one alternative, the method further includes receiving a selection of the symbolic room; displaying a zoomed version of the symbolic room; receiving a selection of a single lighting device of the more than one lighting devices, the single lighting device displayed in the zoomed version of the symbolic room; and activating the single lighting device. Optionally, the single lighting device is not displayed in the graphical representation of a living environment.

BRIEF DESCRIPTION OF THE DRAWINGS

Illustrative embodiments are described in detail below with reference to the attached drawing figures, which are incorporated by reference herein and wherein.

DETAILED DESCRIPTION

In one embodiment, a system for controlling a living environment includes a graphical interface having a graphical representation of the living environment displayed on a computing device capable of receiving touch commands through a touch screen. The user may be able to control individual systems in each room displayed in the graphical representation of the living environment. In some examples, these systems are different lights. In many cases, the user may simply desire to control the lighting (or other system) in an entire room. Instead of having to individually control each light or other system individually in a room, an entire group of interrelated systems may be controlled on a room-by-room basis, with a single touch. In the case of lighting, touching a single room may turn on or off all lights in the room. In some alternatives, a single touch may turn on all lights to a preset level. Furthermore, in some configurations, touching a room may not only turn on or off systems but may automatically display related controls, such as dimmer controls in the case of lighting.

Advantages of such a system are the intuitive nature provided by displaying a map or other representation of the living environment. The one touch actuation provides for rapid and easy control of room systems. The one touch activation and unification of systems on a room-by-room basis, accessible through a graphical representation of the space, is believed to be unique. The word "room" is used throughout this application and should be taken to mean any logical partition of space within a living space and not solely interpreted to mean a room bounded by doors and walls. Many structures have more flowing spaces, so the traditional definition of a room does not make sense.

Figure 1:
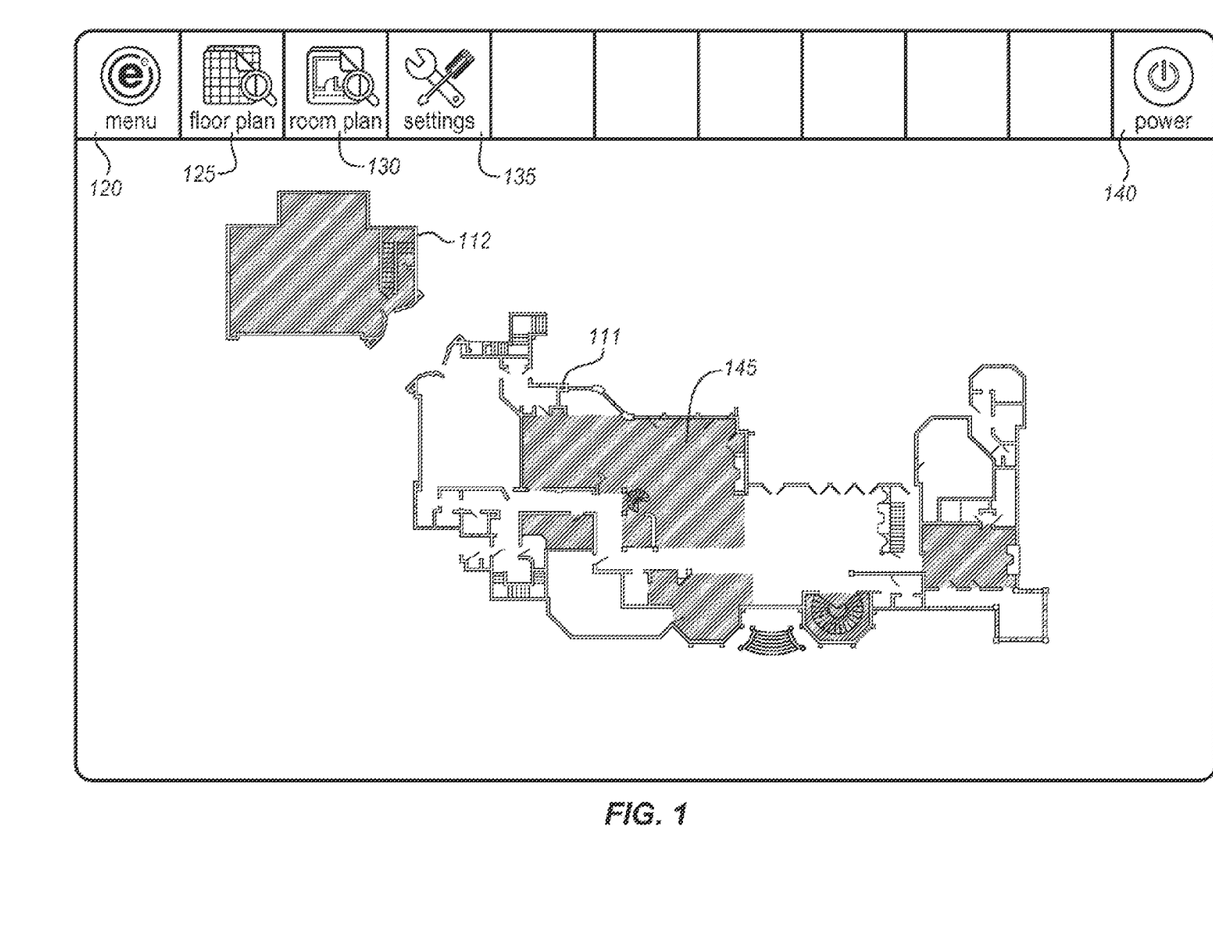
FIG. 1 is an interface for controlling an environmental system of a living environment in accordance with an illustrative embodiment.

FIG. 1 shows an exemplary embodiment of an interface. This graphical interface is displayed on the computing device of a user, which may include devices such as iPads™, iPhones™, Android™-based devices, or other tablet or smartphone-type computing devices. However, any interface with a touch screen may be utilized. Shown is a graphical representation of a living space plan, in this case a house. The first floor 111 and the second floor 112 are visible, with room divisions, stairwells, etc. In some embodiments, individual systems may be pictorially represented in each room. The interface provides for various selections, such as the menu button 120, the floor plan button 125, the room plan button 130, the settings button 135, and the power button 140. Menu button 120 provides for access to menu driven sections of the interface that allow for the user to access graphical interfaces related to different environmental systems, such as lighting, climate control, etc. By touching inside of each room of the living environment, such as in room 145, the user may actuate the home system for the entire room, in this case the lighting. The highlight color of the room then is changed to show that the lighting has been activated. Floor plan button 125 provides a view of the overall layout as shown. By touching room plan button 130, the user may switch views by then touching a particular room. This will give the user a more close-up view of the room and the available systems within that room. Settings button 135 may provide access to other features, such as background and color. Power button 140 may exit the environmental control system.

The interface of FIG. 1 is replicated for each type of environmental system to be controlled. This includes, but is not limited to, shades, sound and media systems, temperature and humidity controls, lighting, security (door locks, alarms, cameras), irrigation, fountains, pools, and spas.

Figure 2:
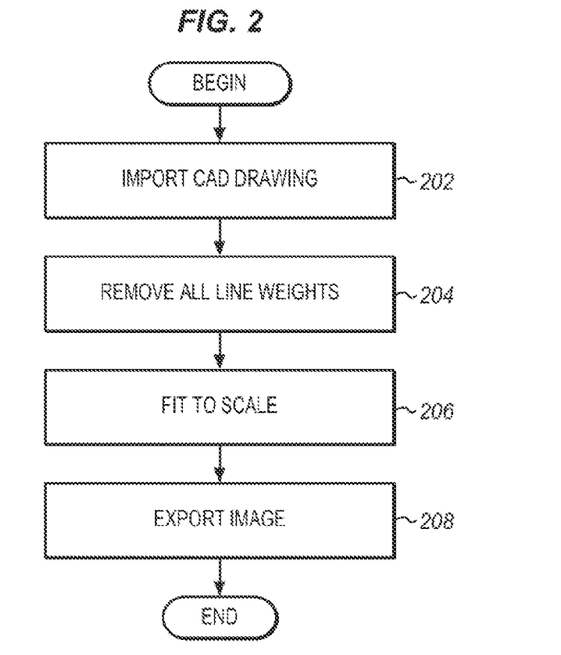
FIG. 2 is a flow chart for importing a graphical representation of a living environment for an interface such as the interface of FIG. 1.

In one embodiment, a method for creating an intuitive and one touch home environmental control system includes a floor plan development step. FIG. 2 shows an exemplary method for developing a floor plan. An image of the floor plan of a house or other building is obtained. This may optionally include outdoor areas as well. This image may be based on pictures, blueprints, construction drawings, etc. Optionally, this image is converted into a CAD (computer-aided design) drawing. Optionally, measurements and other information are used to create a CAD drawing. In step 202, the CAD drawing is imported into a program allowing for the manipulation of the drawing. Optionally, this program is Adobe 111ustratorim or a similar program. In step 204, all of the line weight of the drawing is removed. One result of this is to provide for a more easily viewable image to the user. Further, additional clutter, such as intricate details relating to the construction of the room, is removed. The image then is fit to the scale 206 of the device upon which it is to be displayed. In many cases, this is an iPad™ or other tablet computer. In some options, the scale may be 1024×7 68 1024×768 pixels. In step 208, the image is exported to the proper format for the device that will be receiving it. In some embodiments, this is a .png image.

Figure 3:
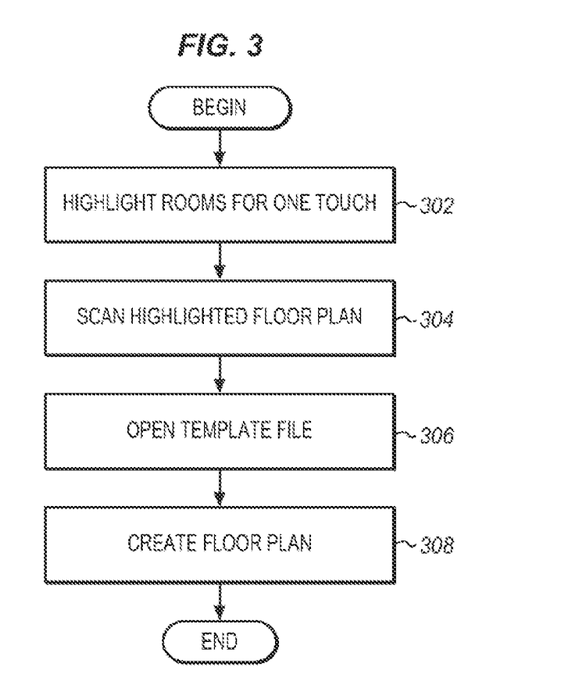
FIG. 3 is a flow chart for creating a floor plan for an interface such as the interface of FIG. 1.

FIG. 3 shows an embodiment of the process of Floor Plan Illustration. In step 302, rooms that utilize one touch activation are highlighted. This ensures only rooms utilizing one touch activation are programmed. In step 304, a color image of the highlighted floor plan is scanned for use as a guide for floor plan illustration. In some embodiments, the image is squared off, so it will appear evenly in the tablet computing system in which it is implemented. This may be performed using Abode Illustrator™ or a similar program. In step 306, a template file is opened (in Adobe Illustrator™, for example) and the straightened floor plan scan is placed on a floor plan layer. The template file includes a background layer and is sized to work with the device that will be utilizing the one touch activation (such as the iPad™). The floor plan is resized to fit a background etouch layer. In some alternatives, depending on the program used, the layer may be locked. In step 308, a floor plan is created by using anchor points, a line tool, and a rectangle tool. Entire floors, exterior and interior walls, doors, windows, fireplaces, stairways, etc., are illustrated. In some instances, the layer is subsequently locked.

Figure 4:
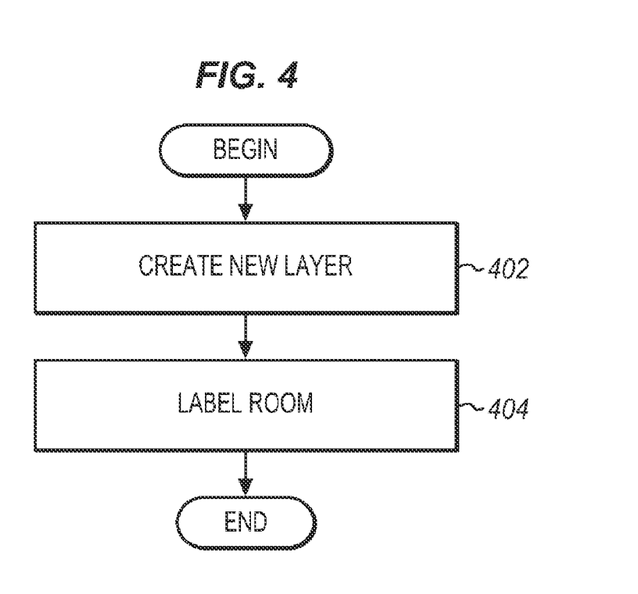
FIG. 4 is a flow chart for labeling rooms for an interface such as the interface of FIG. 1.

FIG. 4 shows an embodiment of a method for labeling rooms. In step 402, a new layer is created for storing room labels. In step 404, the rooms are labeled according to their function.

Figure 5:
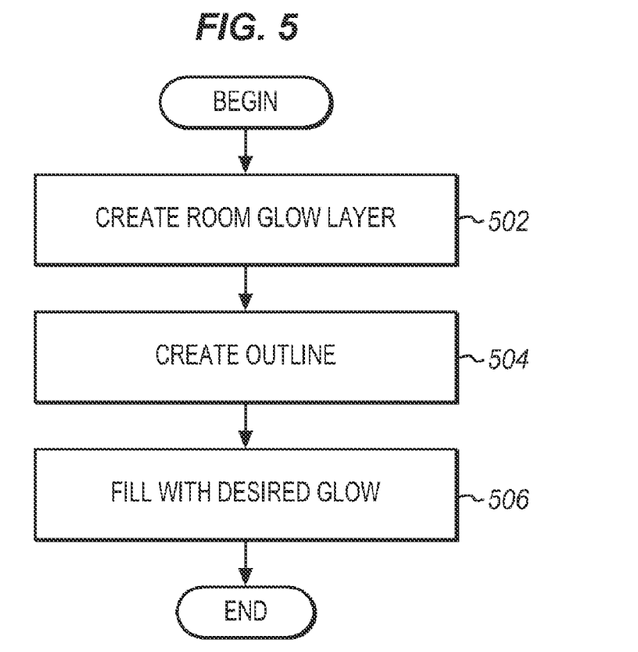
FIG. 5 is a flow chart for creating a glow for an interface such as the interface of FIG. 1.

FIG. 5 shows an embodiment of a method for creating one touch glowing room illustrations. In step 502, a room glow layer is created. In step 504, the anchor points of the room are used to create an outline of the room. In step 506, the outlines are filled with the desired glow color, and the changes are saved.

Figure 6:
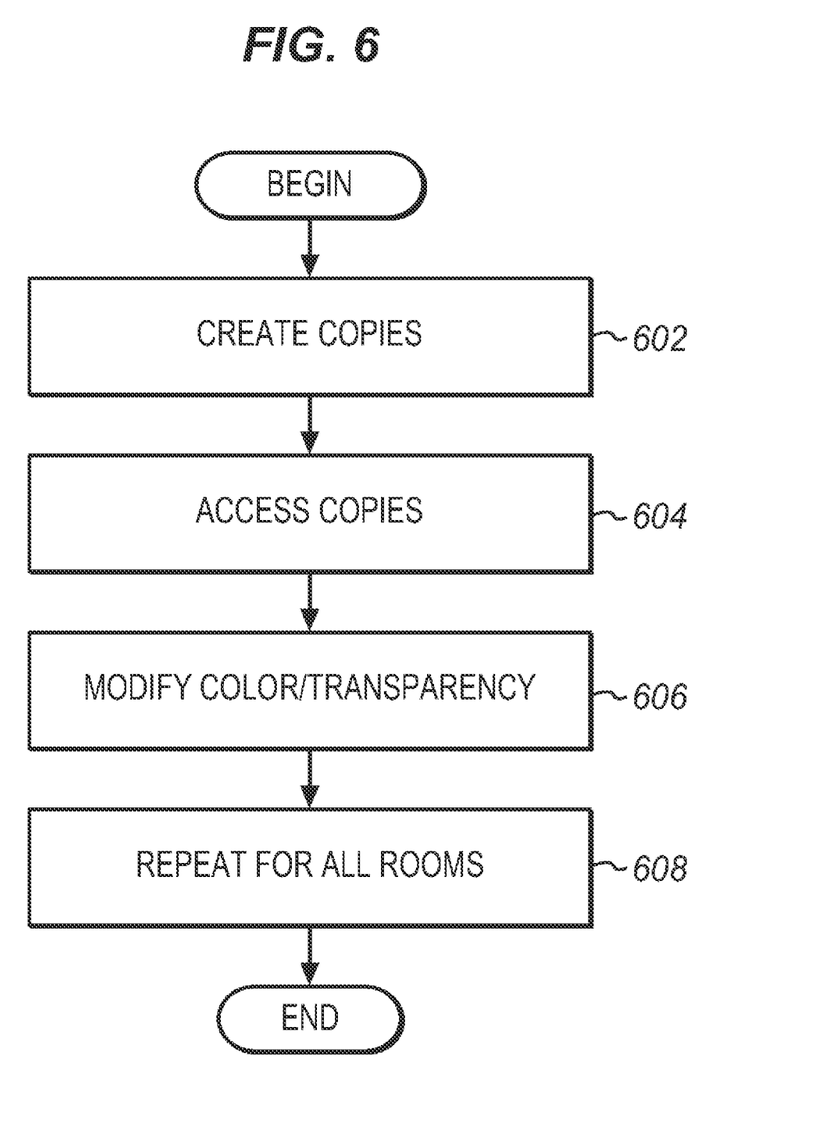
FIG. 6 is a flow chart for creating a plurality of system control graphics for an interface such as the interface of FIG. 1.

FIG. 6 shows an embodiment of a method for creating room states. This method has been generalized, as it applies widely to the creation of room- and plan-based interaction methodology. In step 602, a copy of each original room figure is made for each room state that will be created. For example, four copies may be made and colored red, green, blue, and yellow. In step 604, one of the copies is accessed. In step 606, all of the rooms are accessed in the opened file, and their color and transparency are modified. In step 608, the process is repeated for all of the room state copies.

Subsequently, the different room states are combined and exported in a file format such that room states may be turned on and off. In some embodiments, this involves opening a room state file and turning off all layers except one room. The file then is exported as a png 72 dpi file. Each room layer then is turned on one at a time and repeated until all rooms have been individually exported. This is repeated for each color state file. Finally, each room state file is cropped for final use as a Glow touch button. Each exported png file in Photoshop™ is opened, cropped down to edges, and then saved for each room state.

Once the various room states have been created, an interface for the user may be created. In some alternatives, a system such as Vision Tools Design (VTProE)™ may be used. Regardless of the system or software used to create the interface, in one embodiment, a home page or main page is created. If VTProE is used, a main page join number is assigned. The background image then is imported. This image may be a .png image as discussed above. A top bar and top bar select buttons are added. In some alternatives, top bar join numbers are joined. Generally, this means that the functionality of the buttons is established.

Further, an audio and visual main page may be linked into the main page using the top bar join numbers or other another methodology. The creation of this page is as follows. An AV (audio/visual) main page is created, as well as AV sub-pages. The sub-pages are linked to the AV main page. In some embodiments, this may involve assigning sub-page join numbers. The subpages are assigned to a source. Exemplary sources include wired and satellite-based television or video, local video sources such as DVD (digital video disc) or blue ray players, radio sources, and other data sources such as computers, streaming media over the Internet, and media players (such as iPods™ or iPhones™)

The AV controls may have party mode and television settings sub-pages. The party mode sub-page may have functions including: Menu, Edit Menu, Edit Rooms, Edit Scene Name, and Edit Volume. The television settings sub-page includes all of the standard television controls including, but not limited to, volume control, channel control, interactive channel guide control, and DVR (digital video recorder) functions. In some embodiments, the sub-page may include a channel guide; and actuating the channel guide may call up particular programs, as if they had been accessed according to the television screen-based control Furthermore, room view control buttons may be created. Each room view control button from the floor plan allows the user to press and hold down on the room, and it opens up the room. Now all of the controls and functionality for audio, video, shades, climate, lighting, security, etc., can be operated controlling the automation in that room. Images for the buttons are imported. In some alternatives, these may be virtual representations of light switches, dimmers, or other controls. Each control button may potentially have a plurality of different images for a representation of the control button. These may be on and off images (active and inactive states), or a button may have more than one state in the case of degrees of control.

Additionally, a camera sub-page may also be included. This camera sub-page provides for control of cameras in the house. In some setups, the camera sub-page provides for a camera feed. Additionally, the user may be able to control the orientation of cameras or other characteristics of the camera. For some security systems, the user may turn on and off certain security sensors. Each room may contain many types of security including, but not limited to, motion detectors, floor pressure detectors, beam detectors, and doorway or window trips. By using the one touch system described herein, the user may activate and deactivate single rooms with a simple touch. In some embodiments, a double tap on the security map will turn on or off all security systems. This double tap may be applied across the other system controls as well. In some embodiments, "press and hold" on the security map will flip to that room to see what window or door is armed or unarmed. This "press and hold" feature may be applied across the other system controls as well.

Similar to described above, a climate control sub-page may be created. The climate control sub-pages may be further subdivided into multiple sub-pages, each oriented to a room or zone of climate control. Further, a scheduler sub-page may be included, oriented in relation to the main climate control sub-page or any of the further climate subpages. Temperature and humidity controls may be included, as well as the ability to establish set points for these variables. The ability to select modes which may include presets may be included. Presets may be such sets as vacation, day, and night settings and may automatically switch to different presets. Information concerning the temperature and humidity in various areas may be selectable and presented to the user.

Similar to climate controls, lighting control pages and sub-pages may be included. On/off, analog sliders, or dials maybe may be included, as well as digital readout/controls. The general process for creating particular room views for particular systems is as follows. First, a main page for that system is created. The main page then is joined to the start or menu page. In some embodiments, this is done by assigning a main page join number. The needed room control buttons then are added. In some embodiments, this is done by assigning join numbers and importing images, including an active and inactive state for the button.

In some embodiments, controls for room shades are included. One touch room activation may be possible in this embodiment, a single touch of a room causing the shades to open or close completely. Furthermore, raise, lower, and stop buttons may be included, as well as permeability to light control buttons, which may tilt some types of shades to increase or decrease the amount of light allowed. The user then may select particular shades and actuate the buttons described above.

In the case of irrigation, additional buttons may include a scheduler button for controlling the scheduling of watering. The one touch feature for irrigation, instead of actuating the system in a room, may actuate sprinklers associated with a particular zone of a larger yard. A similar system may be included for outdoor lighting. Lights for particular zones may be unified and accessible via the one touch system, such as walkways and other lighted areas. A single touch of a walkway may activate all lights on the walkway zone.

In some embodiments, the system needs to be compiled and uploaded to the device in order to activate functionality. The compiling may include saving the project in VTProE™ and then compiling the project. The desired device then is connected to the control processor via a variety of possible communication systems, including wireless systems, such as WIFI™ (wireless fidelity, wireless local area network). The file is selected and uploaded to the desired device where it can later be activated.

Figure 7:
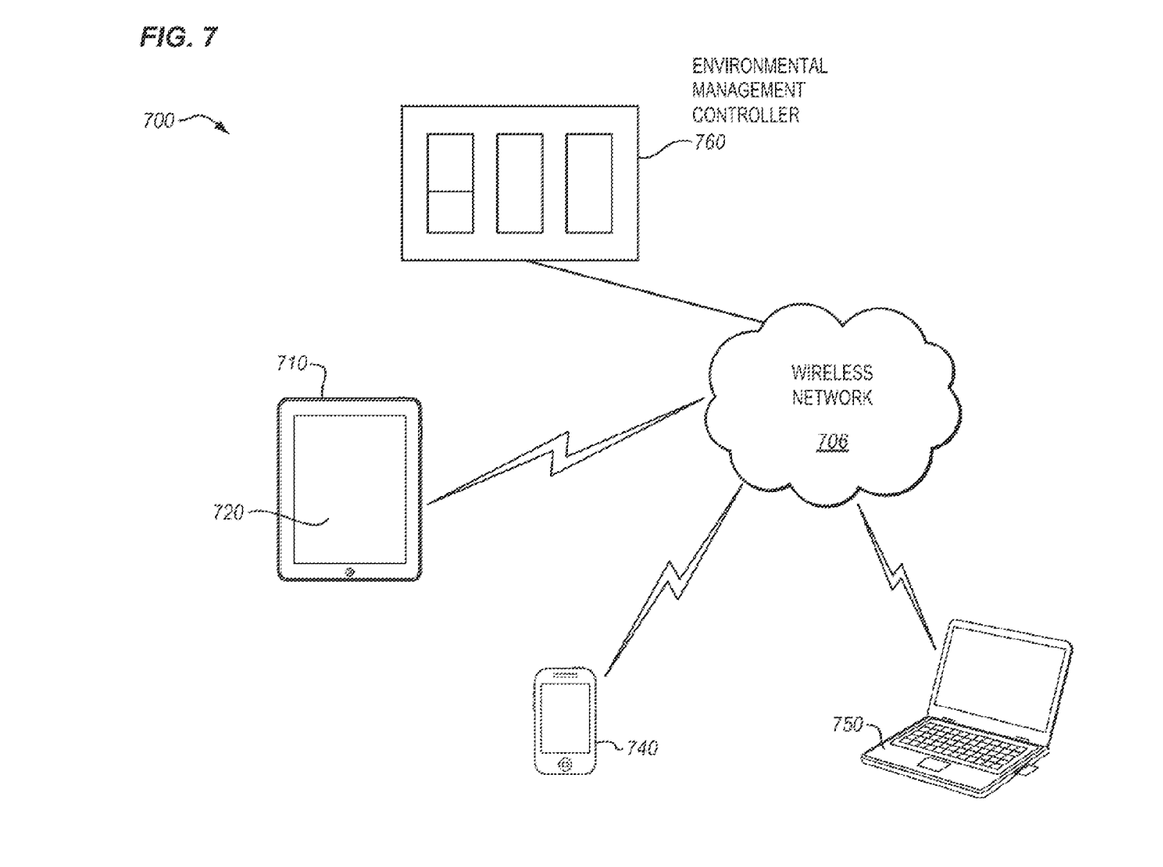
FIG. 7 is a system diagram for a system for controlling an environmental system of a living environment.

FIG. 7 shows an overall view of the system that controls the home environment. System 700 includes touch screen interface computing device 710 implementing the above-described interface 720. Other computing devices 750, such as small touch screen computing systems, or smartphones 740 (such as iPods™, iPhones™, and Android™ devices) also can interact via wireless network 706. Wireless network 706 may be a WiFi network within the environment or may include CDMA (code division multiple access), GSM (global system for mobile), or other mobile phone networks, Bluetooth™ networks, etc. If the wireless network used for access is not local to the environment to be controlled, then the protocol and control signals may have to run through the Internet or other public or private network. Signals from the GUI (graphical user interface) 720 of the computing device 710 flow to the Environmental Management Controller 760 into which all of the systems of the home are centrally wired, either via hard wire or a distributed wireless system. Environmental Management Controller 760 includes software and/or hardware to receive communications from computing device 710 and to translate them into communications to particular home systems.

Figure 8:
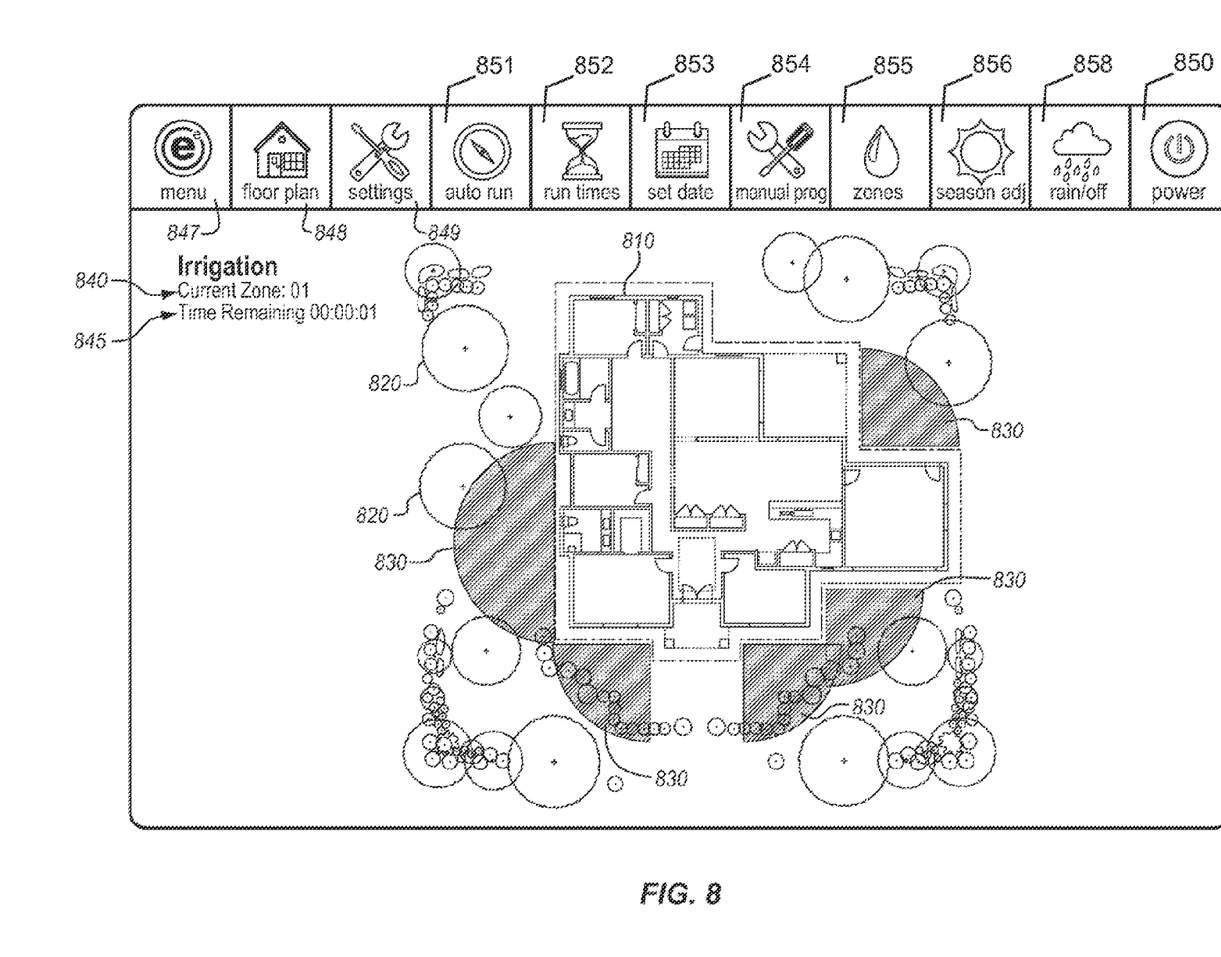
FIG. 8 is an interface for controlling an irrigation system of a living environment in accordance with an illustrative embodiment.

FIG. 8 shows an irrigation control page of the system. In this interface, the house plan 810 as well as landscaping features 820 are included in the interface map. Activation areas 830 are shown and may include one or more water distribution systems. As discussed above, these may be actuated with a single tap. The irrigation control page also includes information about what zone is being watered 840 (if applicable) and the time remaining in the watering event 845 (if applicable). Similar to the discussion above, the interface includes menu 847, floor plan 848, settings 849, and on/off buttons 850. Additional buttons shown here are autorun button 851, which starts a watering cycle; run time button 852, which sets the run time for a cycle; set date button 853, which sets the date for a watering event; manual programming button 854, which allows the user to manually program the system; zone button 855, which allows for reconfiguration of irrigation zones; seasonal adjustment button 856, which provides seasonal adjustment of watering cycles; and rain on/off button 858, which provides for automatic or manual shutoff during rain events.

The previous detailed description is of a small number of embodiments for implementing the invention and is not intended to be limiting in scope. The following claims set forth a number of the embodiments of the invention disclosed with greater particularity.

What is claimed as new and desired to be protected by Letters Patent of the United States is:

1. A system for controlling a living environment, the system comprising:
    a computing device having a touch screen input system;
    the computing device including an interface, the interface including a graphical representation of a living environment to be controlled, where said living environment consists of a plurality of zones depicted in said graphical representation;
    the interface providing for control of more than one type of environmental system distributed within the living environment and for control of a plurality of environmental systems distributed in the living environment;
    one type of environmental system distributed within the living environment comprising a lighting system and a plurality of said environmental systems distributed in said plurality of zones comprising multiple lighting devices;
    the interface configured to activate the environmental systems within a specific zone in the living environment upon touch commands of a user received by the interface via the touch screen input system of the computing device corresponding to said zone depicted in said graphical representation, wherein said interface is configured to cause the touched zone to glow based on it being activated; and
    the interface configured to display a closer view of a specific zone depicted in said graphical representation in response to a press and hold command of a user received by the interface via the touch screen input system of the computing device corresponding to said zone depicted in said graphical representation.

2. The system of claim 1 where one or more of the plurality of environmental systems activated via a touch command are interrelated in their function.

3. The system of claim 1 wherein the closer view of the specific zone contains a detailed view of environmental systems within the specific zone in response to the press and hold command.

4. The system of claim 1 where the computing device communicates wirelessly with at least one of the plurality of environmental systems.

5. The system of claim 1 where the interface is configured to provide control of individual systems of the plurality of environmental systems in the specific zone when the closer view of the specific zone is displayed.

6. The system of claim 1 where the types of environmental systems are selected from a list consisting of lighting systems, home theater systems, climate control systems, irrigation systems, blinds systems, security systems, and combinations thereof.

7. A system for controlling a living environment, the system comprising:
    a computing device having an interface;
    the computing device communicating wirelessly with a plurality of home systems;
    the plurality of home systems selected from a group consisting of lighting systems, home theater systems, climate control systems, irrigation systems, blinds systems, and security systems;
    the interface receiving touch based commands through the computing device;
    the interface providing and displaying a plan view of a home or commercial environment to be controlled, said plan view depicting a plurality of rooms in said home or commercial environment and a portion of the surrounding exterior landscape;
    the interface configured to actuate one or more of said plurality of home systems in a room-wide system when the depiction of a room on the plan view is touched and to cause the touched room to glow based on it being actuated;
    the interface configured to actuate one or more of said plurality of home systems in at least a portion of said exterior landscape of said home or commercial environment when the depiction of said portion of said exterior landscape on the plan view is touched and to cause the depiction of said touched portion of said exterior landscape to glow;
    the room-wide system being deployed in the room, the room-wide system included within one of the plurality of home systems;
    the room-wide system including more than one separately deployed and interconnected device; and
    the interface configured to display an enlarged view of one of the rooms depicted in said plan view in response to a press and hold command of a user received by the interface via the touch screen input system of the computing device corresponding to said room depicted in said plan view.

8. A method of controlling a living environment, the method comprising:
creating a graphical representation of a living environment;
creating a plurality of versions of the graphical representation of the living environment providing for highlighting of particular zones of the graphical representation of the living environment with different colors to correspond with different states of activation;
loading the plurality of versions of the graphical representation on a touch screen interface computing device;
interconnecting a plurality of home systems with the graphical representation;
receiving a touch based command at the touch screen interface computing device, the touch based command being a single touch on a symbolic zone depicted in the graphical representation that corresponds with an actual zone of the living environment; and
activating a portion of a first home system of the plurality of home systems, the portion of the first home system being in the actual zone;
causing the symbolic zone to glow a particular color responsive to the touch based command;
receiving a touch based command at the touch screen interface computing device, the touch based command being a press and hold command on a symbolic zone depicted in the graphical representation that corresponds with an actual zone of the living environment; and
displaying a zoomed version of the symbolic zone in response to the press and hold command.

9. The method of claim 8, further comprising:
communicating with the portion of the first home system through a wireless interface.

10. The method of claim 9 where the plurality of home systems include lighting systems, home theater systems, climate control systems, irrigation systems, blinds systems, and security systems.

11. The method of claim 10 where the first home system is a lighting system.

12. The method of claim 11 where the portion of the first home system includes more than one lighting device.

13. The method of claim 12, further comprising:
receiving a first selection of a menu button;
displaying a menu of environmental controls reflective of the plurality of home systems;
receiving a second selection of one of the menu of environmental controls; and
displaying the graphical representation of the living environment related to the one of the menus of environmental controls.

14. The method of claim 12, further comprising:
receiving a touch based command at the touch screen interface computing device, the touch based command being a single selection of a single lighting device of the more than one lighting devices displayed in the zoomed version of the symbolic zone; and
activating the single lighting device.

15. The method of claim 14 where the single lighting device is not displayed in the graphical representation of a living environment.

* * * * *